United States Patent [19]

Dietzsch et al.

[11] 4,078,909
[45] Mar. 14, 1978

[54] METHOD FOR THE PRODUCTION OF THREAD-LIKE CAPILLARIES

[75] Inventors: Hans-Joachim Dietzsch, Spiegel, Bern; Otto Dietzsch, Stein a Rhein, both of Switzerland; Erich Ufer, St. Augustin, Germany

[73] Assignee: Sandwich-Profil GmbH, Germany

[21] Appl. No.: 749,068

[22] Filed: Dec. 9, 1976

[30] Foreign Application Priority Data

Dec. 12, 1975 Germany .............................. 2555899

[51] Int. Cl.² ............................................. C03B 37/02
[52] U.S. Cl. ...................................... 65/2; 65/11 W; 65/32; 65/86; 425/217
[58] Field of Search .................. 65/1, 2, 11 W, 32, 86; 425/DIG. 217

[56] References Cited

U.S. PATENT DOCUMENTS

| | | | |
|---|---|---|---|
| 3,121,254 | 2/1964 | Heynen et al. | 65/1 X |
| 3,268,313 | 8/1966 | Burgman et al. | 65/2 X |
| 3,701,642 | 10/1972 | Stream | 65/11 W |
| 3,764,286 | 10/1973 | Antczak et al. | 65/32 X |
| 3,870,497 | 3/1975 | Spiessens | 65/32 |

*Primary Examiner*—Robert L. Lindsay, Jr.
*Attorney, Agent, or Firm*—Hill, Gross, Simpson, Van Santen, Steadman, Chiara & Simpson

[57] ABSTRACT

Thread-like capillary tubes are formed by spinning molten glass material through an annular orifice, blowing a gas centrally into the tube issuing from the orifice, drawing the gas filled tube away from the orifice and controlling the flow rate and pressure of the gas and the drawing rate to reduce the tubes to capillary size with a lumen, an external diameter, and a wall thickness of controlled dimensions.

10 Claims, 7 Drawing Figures

METHOD FOR THE PRODUCTION OF THREAD-LIKE CAPILLARIES

FIELD OF THE INVENTION

This invention relates to the art of producing thread-like capillaries from inorganic meltable materials such as glass and specifically deals with the spinning of molten glass through an annular orifice, blowing an inorganic into the plastic tube emerging from the orifice, pulling the tube away from the orifice at a controlled speed, and blowing an inert gas into the tube emerging from the orifice.

The thread-like capillaries formed according to this invention preferably have a diameter of less than 2000 micrometers and a very thin wall with a ratio of wall thickness to external diameter of less than 1 to 6.

Industrial production of fine thread-like capillaries from inorganic meltable materials, for example, silicon compounds, such as glass, quartz or boron trioxide has not heretofore been possible.

SUMMARY OF THE INVENTION

According to this invention, there is provided a method for the production of thread-like capillaries where the capillary cross-section exhibits an extremely small relation of wall thickness to external diameter and the lumen or bore of the capillaries is accurately positioned in the center of the cross section. The method of the invention produces annular capillaries with a wall thickness to an external diameter ratio of less than 1 to 6 and an external diameter of less than 2000 micrometers and these capillaries are particularly useful as hollow fibers in layered composite material.

A feature of the invention is the production of thread-like capillaries with homogeneous wall thicknesses.

Another feature of the invention is the accurate control of the relationship between wall thickness and the external diameter of the capillary throughout a wide range for producing capillary products with desired elasticity, bending, and bulging properties so that when the same are embedded in a matrix they are exactly adaptable to perform their desired functions.

The method of this invention is characterized by the following procedural steps: Fusing of the material, application of a feeding pressure on the molten material and forcing out of the material through a free, ring-shaped spinning aperture in laminar flow, at the same time introducing a filling gas being under pressure into the tube of molten material leaving the aperture, whereby the quantity of the filling gas coming from the interior area of the ring-shaped spinning aperture is such that the filling gas forms the desired lumen of the tube and fills it, and the drawing off of the tube, the external diameter and wall breadth being reduced, as well as cooling of the tube to form a capillary.

It is particularly expedient to work with extremely low spinning temperatures and extremely high spinning pressures, since under these conditions the tube of molten material is expanded well by the filling gas and an exact centering of the lumen in the capillary is possible. It is attempted here to press the molten material through the spinning aperture in such a condition whereby it exhibits an extremely high viscosity and low surface tension. This procedure is contrary to the spinning method production of solid glass fibres where working conditions of very high temperatures and low viscosity but however involving very high surface tension are employed.

The heating and melting of the material to the spinning melt to be processed, that is, the heating of the spinning nozzle and the supply chambers leading to it, as well as the filling gas is carried out by familiar methods, whereby an IR (Infra-Red) irradiation is especially effective, being carried out preferably within a heat-insulated chamber.

As working material for the production of the capillaries a silicon compound such as glass, quartz, or boron trioxide is preferably used. E-Glass (a boron-silicate-glass) has proved to be a particularly suitable material, being processed at the spinning aperture at a spinning temperature of about 1020° C to about 1080° C.

The feeding pressure on the spinning melt can be effected by action on the melt by means of a pressure gas and/or by a correspondingly great filling height of the melt in its supply- or melting chamber, that is, by the hydrostatic pressure of the melt.

The material to be melted, for example glass -is fed preferably in separate pieces to the melting region, preferably in the form of pellets, pieces of rod etc. which, when using a pressure gas for generating the feeding- and spinning pressures, can also be acted upon by the pressure gas. The addition can hereby be effected fully automatically by means of a pressure lock. It is, however, also possible in the cold, although already within the pressurized area above the melting zone, to heap a large quantity of not yet melted material, being continuously removed and fed in measured quantities to the melting zone.

Spinning pressures of 100,000 Pa (Pascal-pressure resulting from a force of 1 Newton acting uniformly over an area of 1 square meter) and over, which can reach up to approximately 2,000,000 Pa, have been found appropriate for feeding the spinning melt to the distribution chamber of a spinning nozzle and through the spinning aperture. Spinning pressures of a magnitude from about 300,000 Pa to about 600,000 Pa are preferably used.

The filling gas, before issuing out into the respective tube of still molten material discharging from the spinning aperture, undergoes a useful fall in pressure, this fall being preferably at least half of the effective back-pressure on the filling gas from the molten tube just below the spinning pressure. This feature ensures a uniform cross section of the spun capillary in that pulsations of the cross section during the spinning process are avoided.

The required pressure difference is obtained by narrowing of the filling gas feed pipe to a relatively small cross section, or by filling it with resisting bodies before its exit in the region of the spinning aperture. The pressure action of the filling gas occurs expediently at about 300 Pa to about 10,000 Pa, preferably about 1000 Pa to about 5000 Pa, depending on the processed material, the temperature in each case, the feed pressure, the speed of drawing off the completed capillaries, the dimensions of the spinning aperture and the desired relation of diameter reduction: wall breadth reduction. The last-mentioned relation lies suitably within a range from about 1:1.5 to about 1:20, preferably within a range from about 1:2 to about 1:8. The diameter reduction is hereby represented as the relation between the external diameter of the spinning aperture and the external diameter of the fibre; the wall breadth reduction is represented as the relation between the width of the spinning aperture and wall breadth of the fibre.

It is important that when proceeding with the method according to the invention one makes sure that the filling gas, being under pressure, is supplied in a quantity and with a pressure such that for the production of the lumen of the capillary it performs work against the surface tension of the still molten tube just below the spinning aperture and in addition transfers energy to the tube, whereby it expands and radially stretches the tube wall during the spinning process.

It is expedient for the process to be carried out at least until drawing off of the tube in a heated protective gas atmosphere, in order that the construction elements are protected against oxidation. It is also advantageous for the surface areas in the interior of the apparatus which are not covered or partly not covered by the glass melt to be protected, whereby one uses a protective gas as pressure gas for the generation of the feeding pressure and/or as filling gas. Possible supporting gases are for example nitrogen, argon, hydrogen or something similar. Even when the gas above the melting chamber is not used as pressure gas for the generation of the feed pressure it is recommended to employ a protective gas here in order to prevent oxidation damage.

It is desirable for the tube coming out of the spinning aperture to be heated from the exterior for a length of tube of at least 1 cm, preferably about 1 cm to about 10 cm, in order to ensure an effective expansion and stretching of the tube before solidification of same.

The temperature and/or the feeding pressure and/or the filling gas pressure and/or the speed of drawing off and hence the diameter and the relation of wall breadth to diameter of the capillary are determined by the variation in diameter which the spinning sphere, depending on its distance from the spinning aperture, undergoes.

The pressing out of the tube from the spinning aperture and the drawing off of same occurs preferably vertically downwards; that is, in a direction in which the force of does not result in onesided deformations but much rather favours the process.

For use of the thus-produced capillaries in layered composite materials it is particularly favourable for the relation diameter reduction: wall breadth reduction in the tube to be maintained as less than or equal to 1:2.

The process proves to be particularly effective when the molten material, before its discharge from the spinning aperture, is directed through a supply area with predominantly static pressure-build-up and here flows around a compact displacement body, which with its lower free end forms the inner limit of the spinning aperture, and when the gas is directed through the displacement body. The supply area with predominantly static pressure-build-up is preferably fed from a supply area with predominantly kinetic pressure-build-up.

The apparatus for the production of thread-like capillaries from meltable materials, especially based on a method according to the invention, is characterized by a heating device which produces the heat necessary for melting the material, by a melting chamber for the melting of the material, by at least one spinning nozzle being supplied with molten material from the melting chamber, into whose nozzle opening projects a displacement body equipped with a through-hole, by a device which feeds the said through-hole with a fluid being under pressure and by a drawing off device for the drawing off of the capillary discharging from the respective nozzle-opening.

According to a particularly advantageous feature of the apparatus, the spinning nozzle contains at least one distribution chamber being equipped with a supply inlet for the molten material, with at least one nozzle-opening opening out on the underside of the distribution chamber, and whereby for every nozzle-opening a displacement body is provided which above the nozzle-opening self-supportingly penetrates the distribution chamber from above and projects with its free end into the nozzle-opening in such a way that a continuous ring-shape aperture is formed between it and the nozzle-opening, whereby further the through-hole opens out in every displacement body on the underside of same, within the said ring-shape spinning aperture. The spinning aperture is preferably circularly cylindrical. This construction of the spinning nozzle guarantees a uniform supply of spinning melt to the spinning aperture and a uniform discharge through same, this being necessary in order that the tube can be expanded and stretched by the filling gas and the drawing off in such a way that with the desired external diameter the desired relation between wall strength and external diameter of the capillary is obtained. By means of the profiling and arrangement of the displacement body the particular achievement is made that despite the high throughput of the molten material being under high pressure, and despite the high temperatures and the forces produced by the blowing-in of the filling gas, the ring-shaped spinning aperture remains constant over the whole ring area and in this way forms a tube with an exactly-centered lumen and uniform well breadth.

It is desirable that the displacement body and/or the distribution chamber, at least in the surrounding of each displacement body, are constructed axially symmetrical to the long-axis of the nozzle-opening. In this way a uniform flow from all directions against the spinning aperture is achieved. It is particularly useful when the spinning aperture is so shaped as to exhibit a constant cross section over its whole ring like course and in the spinning direction over its whole length. The length of the spinning aperture in the spinning direction lies preferably in the order of magnitude of the nozzle-opening diameter.

A high stability of the displacement body is attained when it exhibits a compact cone-like shape and when the diameter of its base-where it opens out on the top side of the distribution chamber is greater than its length calculated from this point to its free end.

According to a preferred feature the displacement body is in each case inserted with its base fitting tightly into the upper side of the nozzle head. The compact junction of the displacement body with the nozzle head is evident over a zone of contact and can be produced by external pressue on the displacement body, by screwing, by soldering or by welding. In the zone of contact the nozzle head and the displacement body can rest directly upon another. It is however also possible to insert a seal in the contact zone. According to a further advantageous feature the respective displacement body forms with its base the upper part of the nozzle head. It is in any case important that the displacement body is connected to the nozzle head only at its base and that it is supported only over its zone of contact here on the nozzle head. There are no further support points or reinforcements between the displacement body and the wall of the distribution chamber or the nozzle-opening which could result in inhomogeneity in the flow of molten material going through the respective spinning aperture.

Particularly useful for the production of thread-like capillaries are spinning nozzles where the development of the contact zone between nozzle head and displacement body at the boundary of the distribution chamber is greater than the two-and-a-half-fold development in the middle of the spinning aperture. It is further useful when the development of the contact zone between nozzle head and displacement body at the boundary of the distribution chamber is equal to or greater than the distance between this point and the nozzle-opening.

The distribution chamber is advantageously so conceived that in it a predominantly static, that is, locally constant pressure-build-up is evident when it is supplied with a molten material being under pressure. This is preferably achieved by the molten material being conveyed into the respective distribution chamber through at least two inlets opening symmetrically to the long-axis of the nozzle-opening. The inlets are preferably arranged along at least one circle, through the center of which the long-axis of the nozzle-opening passes. In the case of a larger number of inlets being provided, these open out according to a particularly preferred feature of the invention, in the outermost and/or uppermost region of the respective distribution chamber so that a larger flow path from the inlets to the opening of the spinning aperture is if possible effected and irregularities in the flow of molten material which arise due to the conveyance through discreet inlets separated from one another can be equalized.

It is expedient to attach a pre-distribution chamber being situated in the main above the (at least one) distribution chamber, which is connected by means of canals with the respective distribution chamber and which can be supplied with the molten material by a conveying means being situated in general asymmetrical to the spinning aperture. In this way an asymmetric pressure-build-up is evident in the pre-distribution chamber. It is particularly useful when every distribution chamber has associated with it its own predistribution chamber. The flow- and pressure- variations arising in the pre-distribution chamber because of the asymmetric conveyance of the molten material are expediently equalized in that the canals leading to the distribution chamber raise the total flow resistance, this advantageously resulting in the sum of the minimal flow cross sections of the canals and inlets leading to the distribution chamber being smaller than the minimal flow cross section leading to the pre-distribution chamber. Since with reference to its volume the pre-distribution chamber is constructed to be considerably larger than the actual distribution chamber it serves as capacity for an additional equalization of pressure- and flow- inhomogeneities. By proceeding according to the measures described above it is possible to construct the actual distribution chamber to be small, whereby the height between the outlets in the distribution chamber and the upper edge of the corresponding nozzle-opening is preferably one-to-three-fold the diameter of the spinning aperture.

It is particularly useful to provide a filtering means in the spinning nozzle, the filtering means preferably covering the inlets to the canals or being attached in the canals.

According to a particularly practical feature of the spinning nozzle the displacement body forms at least the bottom of the pre-distribution chamber, whereby the canals leading to the distribution chamber pass through this.

It is useful when the displacement body on its side facing away from the nozzle-opening leads out from the spinning nozzle and when here the one end of the through-hole opens out, to which a source of gas being under pressure is connected. This construction assures that the contact zone between the base of the displacement body and the nozzle head is situated between the distribution chamber and the outside atmosphere and does not border on areas into which the pressurized filling gas is directed.

In the case of a spinning nozzle containing a large number of nozzle-openings, these having displacement bodies projecting into them and being attached in a nozzle head, it is expedient to have a tubular supporting gas feed pipe associated individually with every displacement body, the feed pipe being connected on its side facing away from the nozzle-opening to a distribution lead or to a distribution chamber for the pressurized filling gas.

In order to avoid cross sectional pulsations in the capillary produced during the spinning process the through-hole in the displacement body is constructed in such a way that a filling gas fed through it undergoes a fall in pressure which is equal to at least half of the effective back-pressure on the filling gas from the molten tube just below the spinning nozzle. This can be effected by a cross sectional narrowing of the through-hole or by the introduction of resisting elements either in or in front of the through-hole.

Between the melting chamber in which the material for the capillaries is melted and the spinning nozzle there is preferably a feed-in chamber provided, which can accommodate a supply of spinning melt and which when suitably shaped and postioned relative to the spinning aperture produces by means of the molten material in it a hydrostatic pressure at the spinning aperture. The supply chamber for the material, being connected directly to the melting zone, can be kept at a lower temperature than the spinning nozzle if the cross sectional flow for the molten material is greater than in the spinning nozzle itself, so that in the supply chamber considerably higher viscosities for the spinning melt can be made use of than in the nozzle area, without any considerable reduction in the supplying speed.

It is further desirable that the apparatus according to the invention contains a supply chamber for the not yet melted material and a dosing device which feeds the material from the supply chamber to the melting chamber. When the feeding pressure is to be produced by a pressure gas, the melting chamber and/or the supply chamber and/or the dosing device are constructed as gas-tight pressure containers, so that they, together with the melted material and the still "cold" material in the supply chamber can be provided with pressure gas coming from a pressure gas source attached to the melting chamber and/or the supply chamber and/or dosing device. For further filling of the supply container with the material attachment of a pressure lock is recommended, enabling one to work continuously.

IR emitters are particularly suitable for the heating of the melting chamber, the feed-in chamber and the spinning nozzle, if necessary also of the first part of the tube of molten material coming out of the spinning nozzle. These IR emitters are arranged together with the construction elements to be heated by them, and the material in these for the capillaries, in a heat-insulated container. It is of advantage to construct the heat-insulated container as gas-tight and being equipped solely at the lower most end with small openings for the spinning threads to pass through in each case. The heat-insulated container is supplied continuously via a supply means connected with a gas source with a protective gas being under pressure, so that small quantities of this protective gas pass out together with the spinning threads through the openings provided for same. By arranging the lowermost opening of the spinning nozzle within the heat-insulated container the tube discharging out of the spinning aperture can be heated from the exterior for a length of at least 1 cm, preferably 1 cm to 10 cm.

As material for the spinning nozzle, the displacement body and the filling gas supply means metal can be used, (eg, chrome-nickel, steel, V4A - Steel, iron-chrome-aluminum alloys, platinum alloys, etc.) but also ceramic (eg. metal oxide ceramic, especially aluminum oxide ceramic). It is also possible to use a combination of several materials, eg. oxide ceramic materials coated or lined with layered precious metals.

At least the construction elements coming into contact with the molten material and/or the filling gas supply means should consist of such an anti-corrosion metal, or else be coated with a corresponding material.

In order to protect the surface areas of the spinning nozzle, the melting chamber and/or the feed-in chamber which are not covered or are only partly covered by the molten material, and/or the filling gas supply means against oxidation, the furnishing or a protective gas is recommended.

It is expedient to arrange the drawing off device, preferably a storage drum, in a chamber whose atmosphere is maintained extremely dry. This chamber exhibits advantageously a raised temperature of eg. 40° C.

The enclosed drawings serve as further clarification of the invention. The figures are for the sake of an overall view not drawn to scale.

AS SHOWN ON THE DRAWINGS

Corresponding parts are indicated in all figures with correlating reference symbols.

Figure 1:
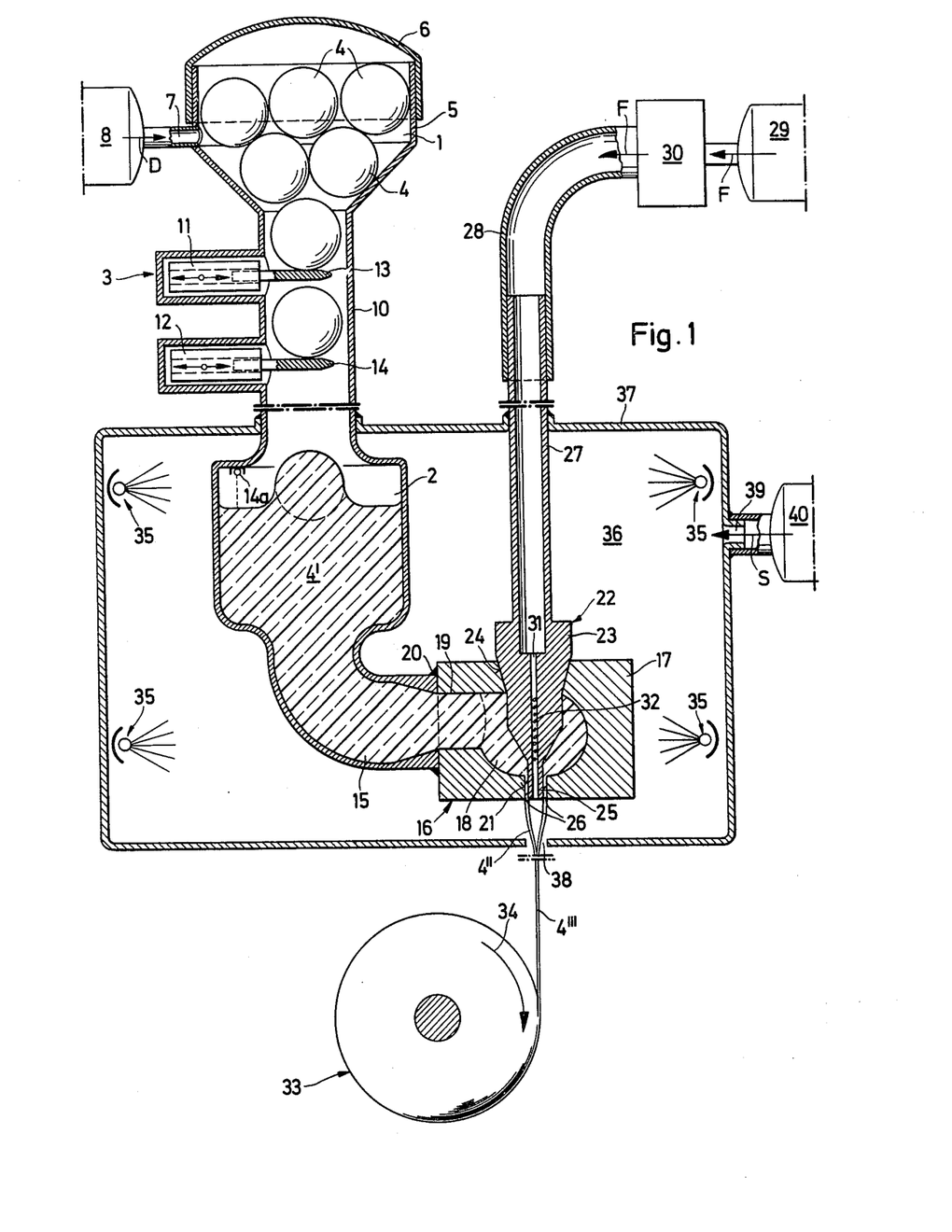
FIG. 1 shows a section through an apparatus for the production of thread-like capillaries according to this invention.

The apparatus depicted in FIG. 1 for the production of threadlike capillaries contains a supply chamber 1 and underneath it a melting chamber 2, between which a dosing device 3 is arranged. This serves to dose in measured quantities the pellets 4 of material to be melted, these being in the supply chamber 1, to the melting chamber 2. The supply chamber 1 consists of a funnel-shaped lower part 5 and a removable lid 6, this being connected with the lower part 5 in a gas-tight manner. In place of the lid a pressure lock not shown in the drawing can be provided for filling the supply chamber. In the supply chamber 1, a lead 7 opens out for the pressure gas D, which is supplied from a pressure gas source 8, this source having been only diagrammatically indicated. The supply chamber 1 opens via a vertical tube 10 into the melting chamber 2. At the side of the vertical tube 10 two lifting magnets 11 and 12 are attached, being displaced in a longitudinal direction relative to the tube and whose fingers 13 and 14 projecting into the tube 10 are so manipulated that in each case single pellets 4 of the material can fall into the melting chamber. The magnets 11 and 12 are also attached to the apparatus in a gas-tight fashion so that the pressure gas D fed to the supply chamber 1 can expose the melted material 4' in the melting chamber 2, via the dosing device, to a feeding pressure.

The rate at which the melted material 4' fills the melting chamber 2 is determined by means of a device 14a, which works for example according to the principle of an echo sounder. By means of the device 14a and the magnets 11 and 12 manipulated by the device in a way not indicated more closely it is achieved that the molten material 4' in the melting chamber 2 always reaches the same level and thus exerts and approximately constant hydrostatic pressure on the spinning nozzle 16 connected via a feed-in chamber 15 to the melting chamber 2. When the melting chamber and the feed-in chamber are of a considerable height the hydrostatic pressure of the molten material 4' can create a feeding pressure at the spinning nozzle 16 which suffices for the pressing out of the desired threadlike capillaries, so that in this case a pressure gas D is not necessary. However, since the supply of a protective gas to the supply chamber 1, the dosing device 3 and the melting chamber 2 is recommended in any case in order to prevent oxidation, it is as a rule preferable to produce the feeding pressure required at the spinning nozzle 16 at least partly by means of the pressure gas D.

The spinning nozzle 16 consists of a nozzle head 17 having inside it a chamber-like distribution means 18 into which the molten material 4' flows through a feeding means 19. The feeding means leads out laterally from the nozzle head 17 as a cylinder with a large diameter and is attached to the distribution chamber 15, this being effected for example as shown in FIG. 1, by a welded joint 20. The free cross sectional flow is chosen to be greater in the feedin chamber 15 than in the spinning nozzle 16. The spinning nozzle 16 is further provided with a nozzle-opening 21 on its underside this being in the illustrated case a circular cylinder running down vertically in relation to the bottom surface of the nozzle head 17 and opening out into the distribution chamber 18 in such a way that the distribution chamber lies nearly symmetrical to the long axis of the nozzle-opening 21. A displacement body 22 is inserted into the top side of the nozzle head 17 in such a way that it long axis is in alignment with the axis of the nozzle-opening 21. The displacement body 22 is supported at its base 23 over a conically tapering contact zone 24 on a corresponding conical surface of the nozzle head 17. The surfaces in the region of the contact zone 24 are so conceived that the displacement body 22 sits tightly and immovably in the nozzle head 17. The displacement body 22 has a sturdy conelike shape in the region of the distribution chamber. Its cross sectional surface decreases from the side facing towards the base 23 in the direction of the nozzle-opening 21, into which the free end 25 of the displacement body, being provided with a circularly dylindrical exterior surface, projects in such a way that between this exterior surface and the nozzle-opening 21 a uniform ring-like spinning aperture 26 is formed, through which the molten material is pressed as tube 4" with uniform wall filing. The displacement body 22 has as its upper end a connecting pipe 27 attached to a feed pipe 28 which is supplied via a distributing chamber 30 allowing for the attachment of further displacement bodies and further spinning nozzles to a filling gas F being under pressure and coming from the filling gas source 29. The bore of the connecting pipe 27 tapers in the interior of the displacement body 22 to a through-hole 31 which passes centrally through the displacement body in the direction of the displacement body's long axis, and opens out in the middle of the free end 25 of the displacement body. The reduced cross section of the through-hole 31 results in a high pressure differential for the filling gas F between the connecting pipe 27 and the outlet in the interior of the spinning aperture 26. It is also possible, as indicated by designation 32, to attach additional resisting bodies in the through-hole 31 or in that case also in the connecting pipe, in order to further increase the pressure drop. The tube 4" being pressed through the spinning aperture 26 is filled by the filling gas F and maintained in a stable shape.

Underneath the spinning nozzle 16 a drawing off device 33 is attached which in the case illustrated is formed by a storage drum turning in the direction of the arrow 34 which winds up the finished thread-like capillaries 4'''.

Heating of the apparatus is effected by means of IR emitters 35 which are so arranged around the melting chamber, the feed-in chamber, the spinning nozzle 16 with the displacement body 22 and the connecting pipe 27 connected to it, that they heat up to the desired temperature. Since greater cross section flows are evident in the melting chamber 2 and in the feed-in chamber 15 than in the spinning nozzle 16, the temperature in the melting chamber and in the feed-in chamber can be kept lower than that required for the actual spinning process in the spinning nozzle 16 because the increased velocity of the spinning melt in this region is equalized by means of the larger cross sections.

The heating device and the construction elements to be heated by it are attached in a heat-insulated chamber 36 which is formed by a gas-tight housing 37 equipped with corresponding heat-insulation layers. The housing 37 extends down somewhat below the spinning nozzle 16 so that a piece of the liquid tube 4" of molten material discharging from the spinning aperture also runs in the interior of the heat-insulated chamber before being directed out of the chamber through an opening 38 beneath the spinning aperture 26. There is a further inlet 39 opening into the chamber, this being for a protective gas S which is directed from a corresponding source 40 under limited excess pressure into the chamber 36 and which protects the construction elements against oxidation, a small quantity of the protective gas always passing out through the opening 38 with the tube 4".

When using the apparatus precedingly described the pellets in the supply chamber 1 are supplied, according to the consumption of the spinning melt at the spinning aperture 26, piece by piece to the melting chamber 2, whereby at a signal from the device 44 the lifting magnets 11 and 12 and the tongues 13 and 14 connected to them are correspondingly operated. The material in the melting chamber 2, having been heated and melted by the heat produced from the IR emitters 35 is conveyed by means of its self-exerted hydrostatic pressure and by means of the pressure gas D through the feed-in chamber 15 into the distribution chamber 18 and from there is pressed out through the spinning aperture 26 as a tube 4" and is drawn off by the drawing off device 33, whereby the lumen of the tube 4" is filled and expanded by the filling gas F fed through the through-hole 31.

During this process the chamber 36 is exposed to the protective gas S, which passes out through the opening 38 in small quantities.

The following description refers to the spinning nozzle variants represented in FIGS. 2–5 which can be used instead of the spinning nozzle 16 described in FIG. 1. In the version represented in FIG. 2, a displacement body 42 forms the whole upper part of a spinning nozzle 41 whose lower part consists of a pot-like constructed nozzle head 43. The displacement body 42 is inserted into the pot-like nozzle head 43 in such a way that a wide contact - and support - zone 44 results between these construction elements, this zone curving upwards and outwards in a step-wise fashion in order to achieve good centering of the construction elements in relation to each other. The displacement body 42 which, as in the previously described case projects with its free end centrally into the spinning-opening attached in the nozzle head and which forms a ring-like shaped spinning aperture with this, forms the top side of the distribution chamber 18, whose side walls and bottom are formed by the nozzle head. The feeding of the molten material to the distribution chamber 18 occurs through cylinders 45. The cylinders 45 are so arranged at equidistant intervals on a circular arc around the long-axis of the displacement body, that they open out at the edge of the distribution chamber onto the top side of the same and symmetrical to the spinning aperture. The cylinders 45 connect the distribution chamber 18 with a ring-like pre-distribution chamber also being formed by the displacement body. A lateral cylinder 47 being connected to the feed-in chamber 15 opens out into the pre-distribution chamber 46.

The cylinders 45 leading from the pre-distribution chamber into the distribution chamber have a considerably narrower cross section than the cylinder 47, via which the pre-distribution chamber is fed with the molten material. Both the pre-distribution chamber 46 and the considerably smaller distribution chamber 18 are shaped with their inner walls as flow-advantageous as possible, so that no dead corners occur in which the molten material doesn't exchange. On the bottom of the pre-distribution chamber a filter packet is further provided, consisting of a coarse filter 46a and a fine filter 46b. The pre-distribution chamber 46 is closed by means of a tightly-fitting ring-shaped lid 48. In the example depicted in FIG. 2 both the displacement body and the nozzle head as well as the ring-like lid and the displacement body are welded together, this being indicated by the welding joints 49 and 50.

Figure 2:
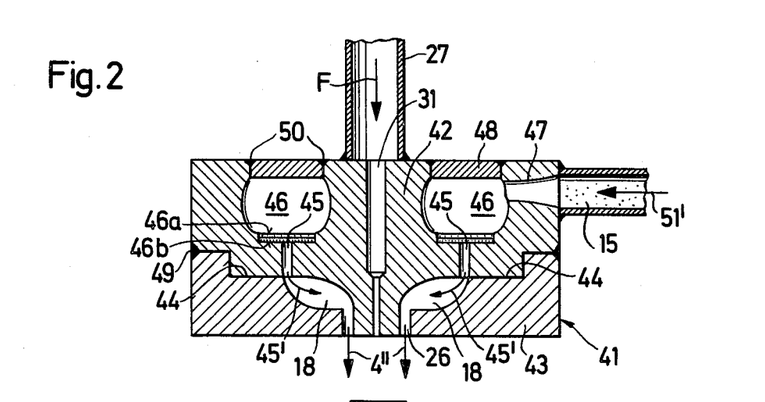
FIG. 2 shows a longitudinal section through a spinning nozzle variant.

When using th spinning nozzle represented in FIG. 2 the molten material as indicated by arrow 51' is conveyed under pressure through the feed-in chamber 15 and the cylinder 47 into the pre-distribution chamber 46, from where it flows as indicated by arrow 45' into the distribution chamber 18, this flow being symmetrical to the spinning aperture and to the part of the displacement body 42 freely projecting into the distribution chamber 18. The molten material 4" finally leaves the distribution chamber 18 as described in the previous case through the spinning aperture 26, as indicated by the corresponding arrow 4". The nozzle in FIG. 2 has the advantage that in the distribution chamber symmetrical pressure- and flow-distribution with reference to the spinning aperture is effected. It is thus assured that the finished capillaries, also after expansion and stretching by the drawing off apparatus and the feeding of the supporting gas F via the connecting pipe 27 and the through-hole 31 retain a uniform wall.

Figure 3:
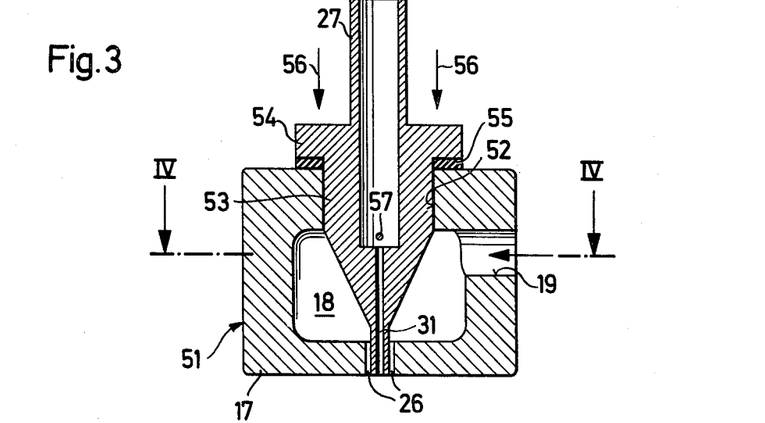
FIG. 3 shows a longitudinal section through another spinning nozzle variant.

FIG. 3 shows a longitudinal section through a further spinning nozzle variant 51, which apart from the subsequently described differences is constructed according to the spinning nozzle 16 of FIG. 1. Into the nozzle head 17 of the spinning nozzle 51 a displacement body 53 is inserted by means of a circular cylinder 52 leading out from one of its upper sides. The displacement body rests over the area of its torus-shaped base 54 on the upper side the nozzle head 17, whereby it is supported by a sealing ring 55 placed between them. In order to effect better sealing, the stable setting between the nozzle head and the displacement body can reinforced by a force in the direction of arrow 56. The force indicated by arrow 56 can be effected by support weights but also by screwing between the nozzle head and the displacement body.

In the spinning nozzle version represented in FIG. 3 the cylinder of the connecting pipe 27 for the conveyance of the supporting gas F extends with uniform cross section in the interior of the displacement body 53 as far as the region at which the displacement body enters distribution chamber 18, and then from there tapers concically towards its free end. The through-hole 31 leading to the spinning aperture 26 and which attaches here is constructed, contrary to the connecting pipe 27, with a reduced interior diameter so as to achieve a pressure drop. Further, a wire-like resisting body 57 is attached in front of the entrance to the through-hole 31 for additional increase of the pressure drop of the filling gas F.

Figure 4:
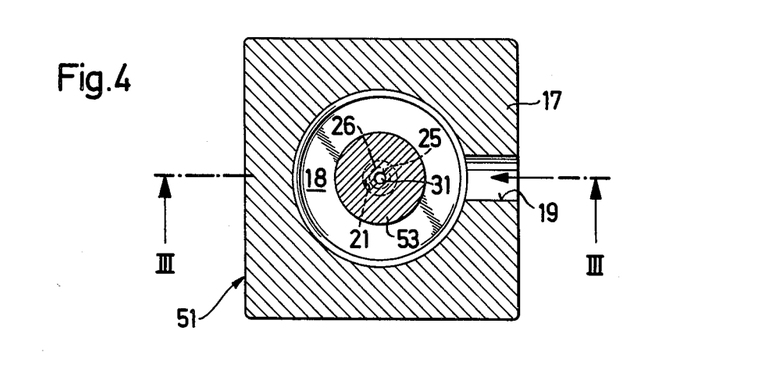
FIG. 4 shows a section through FIG. 3 along the lines IV—IV.

The cross sectional representation of FIG. 4 shows the rotationally symmetric construction of the distribution chamber 18 around the displacement body 53. The ring-shaped spinning aperture 26 can also be recognized, being limited by the nozzle-opening 21 and the cylindrical outer wall of the free end 25 of the displacement body.

Figure 5:
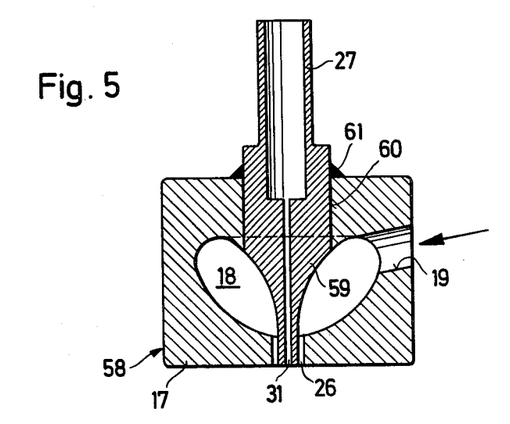
FIG. 5 shows a longitudinal section through a further spinning nozzle variant.

In FIG. 5 as a further variant a spinning nozzle 58 is shown whereby a displacement body 59 is held at its base in the nozzle head by means of a long cylindrical setting. A welding joint 61 effects fixation of the displacement body's seal. The floor of the distribution chamber 18 and the conical surface of the displacement body 59 facing it are constructed as concave surfaces merging uniformly and curve-like into each other until at the lowest point of the distribution chamber 18 the spinning aperture 26 opens out.

Figure 6:
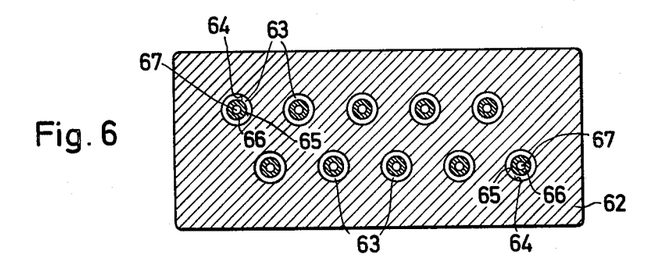
FIG. 6 shows in cross section a spinning aperture area with a linearly staggered arrangement of several spinning nozzles.

In FIG. 6 a device is diagrammatically represented enabling simultaneous production of a large number of thread-like capillaries. The diagram shows only a section through a spinning nozzle plate 62 which corresponds to the floor of the spinning nozzle head 17 in the previously described models. In the spinning nozzle plate 62 linearly staggered spinning apertures are arranged which are formed by means of the nozzle openings 64 in the spinning nozzle plate and the outer walls 65 of the displacement bodies, being provided with through-holes 67, which project into the nozzle openings. The displacement bodies 66 are, as in the previously described examples, arranged in a common distribution chamber for the spinning melt (this chamber not being shown in closer detail in the drawing) via which the molten material is conveyed to the separate spinning apertures.

Figure 7:
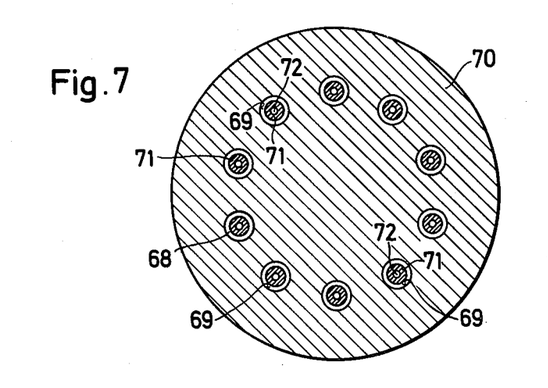
FIG. 7 shows in cross section a spinning aperture area with a ring-like arrangement of several spinning nozzles.

FIG. 7 shows a corresponding circular arrangement of spinning nozzles, whereby here too only the individual spinning apertures 68 are represented in cross section. These spinning apertures 68 are, as in the case of FIG. 6, formed from cylinders 69 arranged in a common spinning nozzle plate 70, whereby a displacement body 71 being equipped with a corresponding through-hole 72 for the supply of filling gas projects into each of the cylinders.

EXAMPLE:

The following is an example for the production of threadlike capillaries.

In a spinning nozzle with a spinning aperture external diameter of 3mm, a spinning aperture internal diameter of 2 mm and a spinning aperture length of 3 mm, and with an 11 mm-long through-hole of 1 mm diameter, E-Glass was employed as working material, a glass with the following composition:

$SiO_2$: 53.0%
$B_2O_3$: 8.5%
$Al_2O_3$: 15.0%
Alkali: 0.5%
CaO: 21.0%

The glass was spun at the spinning aperture with a spinning pressure of 300,000 Pa and a filling gas pressure of 1500 Pa at a temperature of 1050° C, and at a withdrawal speed for the finished capillaries of 10mm/sec drawn off. The capillaries obtained had an external diameter of 0.100 mm and an internal diameter of 0.086 mm. With a relation of spinning aperture external diameter to fibre external diameter of 3 : 0.1 = 30 and with a relation of spinning aperture breadth to fibre wall breadth of 0.5 : 0.007 = 71.4, the relation of diameter breadth reduction to wall breadth reduction 30 : 71.4 = 1 : 2.38 is obtained.

As material for the spinning nozzle and the displacement body an iron-chrome-aluminum alloy with the following composition was used:

Aluminum: 5%
Chrome: 25%
Iron: Balance
this alloy being sold by the firm C. Kuhbier and Son under the designation "Cekas extra 3".

The tensile and compression strengths with respect to the weight of the capillaries according to the invention lie far above those of solid fibres of equal external diameter and of the same material. The relation of the strength values of these two types of fibres can be greater than 10 : 1. Since the weight-relative strength properties are largely the determining factors for the practical application of the material, the properties obtained here are of considerable advantage. Further, the invention is extremely well adapted for industrial production since by means of the spinning nozzle-openings a considerably higher material through-put for given strength requirements is possible. Under the action of a load transverse to their axes the capillaries can be elastically in cross section deformed. This renders the capillaries particularly suitable for use in layered composite materials as it hereby guaranteed that in cases of extreme load singular tension conditions can be equalized and local overburdening of the structure from this material avoided.

We claim as our invention:

1. The method of making small capillary tubes from meltable silicon containing inorganic materials which comprises melting silicon containing inorganic material selected from the group including glass, quartz, and boron trioxide in a melting chamber, feeding the molten material from said chamber into an annular distribution chamber around a central displacement body, discharging the molten material from said distribution chamber through an annular spinning orifice at spinning pressures above about 300,000 Pa and at temperatures of not more than about 1080° C, forming a tube of the molten material issuing from the orifice, blowing a gas through said displacement body into the tube issuing from the orifice, pulling the gas-filled tube from the orifice, and controlling the flow of the gas and the pulling rate to reduce the tube to a capillary size with a lumen, an external diameter, and a wall thickness of controlled dimensions.

2. The method of making thread-like capillaries with a diameter of less than 2,000 micrometers and a wall thickness to external diameter ratio of less than 1 to 6 from silicon containing inorganic meltable material selected from the group including glass, quartz, and boron trioxide, which comprises melting the material in a chamber, feeding the resulting molten material from said chamber to an annular distribution chamber having an outlet orifice and around a central displacement body projecting into said orifice and terminating flush with the exit end thereof in spaced concentric relation from the orifice wall, forcing the molten material from said annular distribution chamber through the resulting ring-shaped spinning nozzle at low temperatures between about 1020° C to about 1080° C and high pressures above about 300,000 Pa, forming a tube of the material exiting from the spinning nozzle, simultaneously blowing a gas under pressure through said displacement body into said tube flush with the exiting end of said spinning nozzle at the center of said nozzle to fill the tube as it leaves the nozzle, pulling the gas filled tube from the nozzle at a controlled speed, controlling the rate of flow of the gas and the pulling rate of the tube to reduce the tube to the desired external diameter and wall thickness, and cooling the resulting capillary tube.

3. The method of making small capillary tubes from meltable silicon containing inorganic materials which comprises melting silicon containing inorganic material selected from the group including glass, quartz, and boron trioxide in a melting chamber, feeding the molten material from said chamber into an annular distribution chamber around a central displacement body, discharging the molten material from said distribution chamber through an annular spinning orifice at spinning pressures above about 100,000 Pa and at temperatures of not more than about 1080° C, forming a tube of the molten material issuing from the orifice, blowing a gas through said displacement body into the tube issuing from the orifice, said gas being subjected to a pressure drop of at least one half of the initial gas pressure, pulling the gas-filled tube from the orifice, and controlling the flow of the gas and the pulling rate to reduce the tube to a capillary size with a lumen, an external diameter, and a wall thickness of controlled dimensions.

4. The method of claim 1 wherein the meltable material is a boron silicate glass.

5. The method of claim 1 including the step of gas pressurizing the melting chamber.

6. The method of claim 1 including the step of controlling the level of molten material in the melting chamber within prescribed limits above the distribution chamber.

7. The method of claim 1 including the added step of feeding the molten material from the melting chamber into a predistribution chamber and then feeding the molten material from the predistribution chamber to said distribution chamber.

8. The method of claim 1 including the added step of heating the tube emerging from the aperture for a length of from about 1 cm to about 10 cm.

9. The method of claim 1 including the step of subjecting the gas fed to the tube emerging from the aperture to a pressure drop of at least ½ of the initial gas pressure.

10. The method of claim 1 including the step of selectively feeding solid pellets in succession to the top of the melting chamber.

* * * * *